A. F. OLDS.
AUTOMOBILE STARTING MECHANISM.
APPLICATION FILED MAY 3, 1911.
1,021,624.
Patented Mar. 26, 1912.
3 SHEETS—SHEET 2.
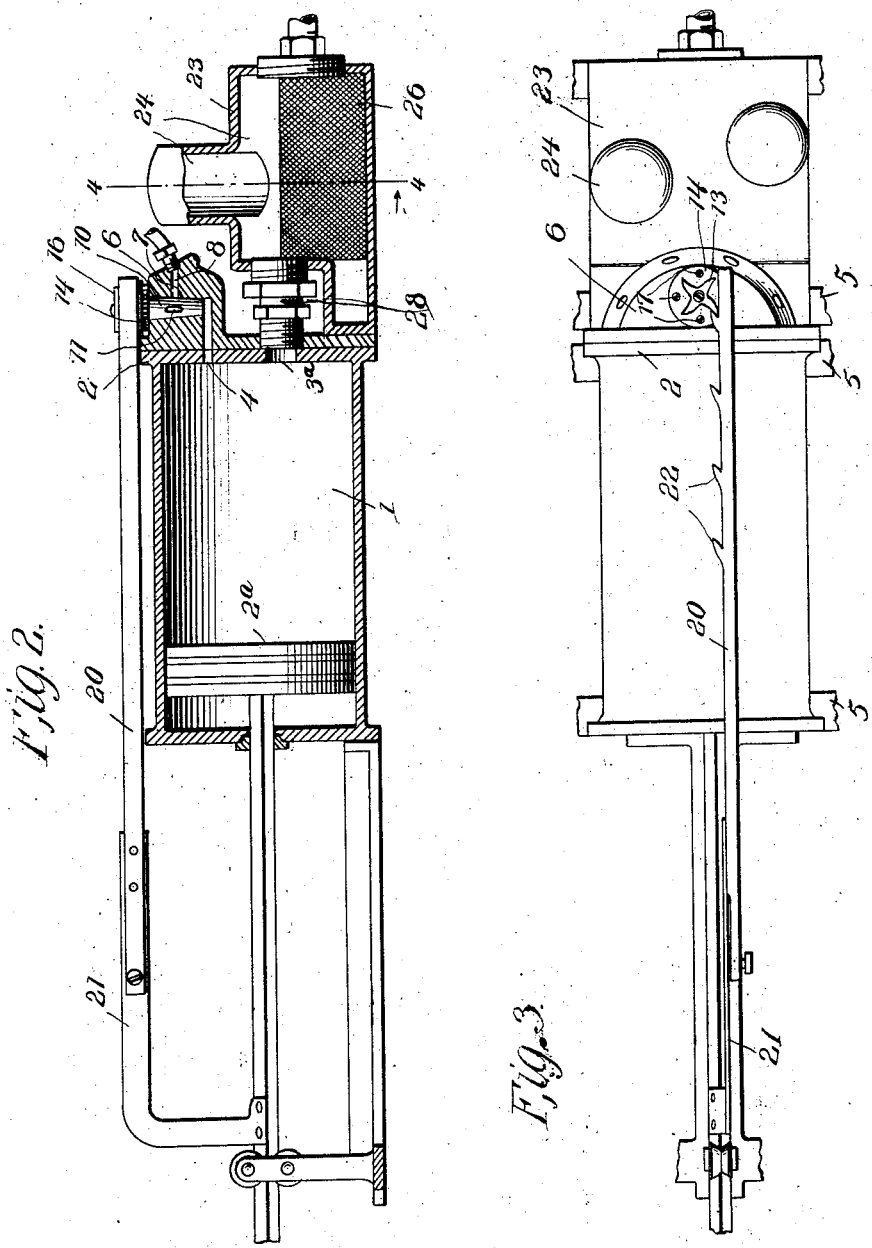
Witnesses
William Smith
V. B. Hillyard
Inventor
Alonzo F. Olds.
By Victor J. Evans
Attorney

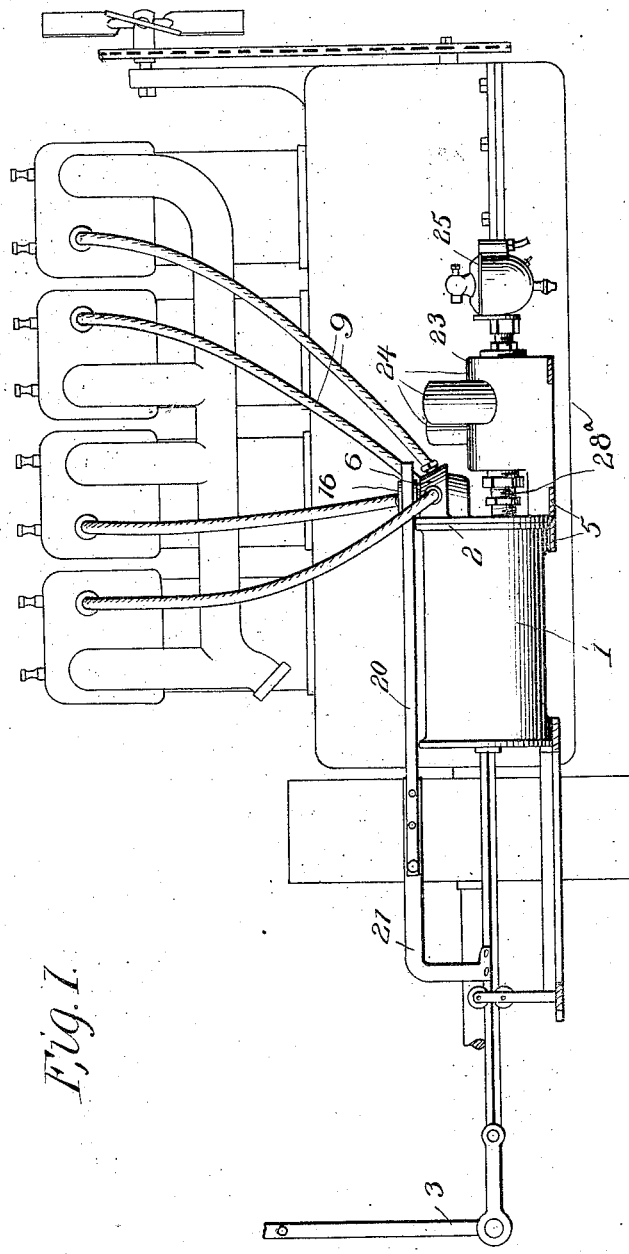

A. F. OLDS.
AUTOMOBILE STARTING MECHANISM.
APPLICATION FILED MAY 3, 1911.

1,021,624.

Patented Mar. 26, 1912.
3 SHEETS—SHEET 3.

Witnesses
William Smith
U. B. Hillyard.

Inventor
Alonzo F. Olds.
By Victor J. Evans
Attorney

UNITED STATES PATENT OFFICE.

ALONZO F. OLDS, OF CHICAGO, ILLINOIS.

AUTOMOBILE STARTING MECHANISM.

1,021,624.    Specification of Letters Patent.    Patented Mar. 26, 1912.

Application filed May 3, 1911. Serial No. 624,726.

*To all whom it may concern:*

Be it known that I, ALONZO F. OLDS, a citizen of the United States, residing at Chicago, in the county of Cook and State of Illinois, have invented new and useful Improvements in Automobile Starting Mechanism, of which the following is a specification.

Engines of the gasolene type used for propelling automobiles and machinery generally require the initial expenditure of force when starting and it is the common practice to employ a crank as the starting means, said crank being manipulated by hand. Starting mechanism for internal combustion engines operable by hand is hazardous because of premature ignition producing back firing. Moreover, the operation of the starting crank of an automobile is frequently attended with inconvenience and annoyance since the operator often times is required to obtain a footing in slush and damp places.

The present invention provides a mechanism admitting of the starting of an automobile from the driver's seat and wholly free from the dangers of premature explosion, said mechanism embodying a cylinder, a piston arranged to operate in the cylinder, means for actuating the piston to draw in a supply of gas and to force the same to the required point of use, a valve mechanism operated simultaneously with the piston to direct the gas to the proper cylinder of the engine and means for supplying the cylinder with a gaseous mixture upon the suction or outstroke of the piston.

The invention consists of the novel features, details of construction and combination of parts, which hereinafter will be more particularly set forth, illustrated in the accompanying drawings, and pointed out in the appended claims.

Figure 4:
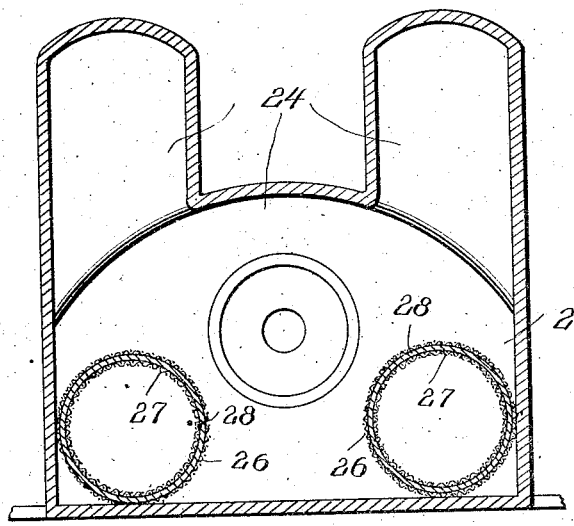
Figure 5:
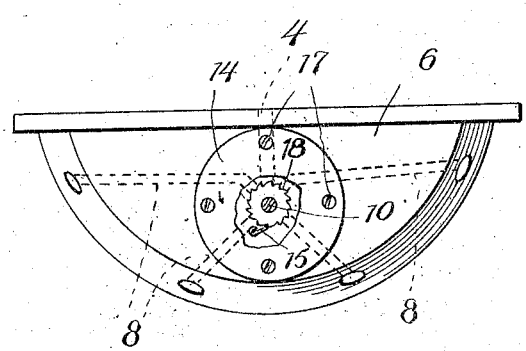
Figure 6:
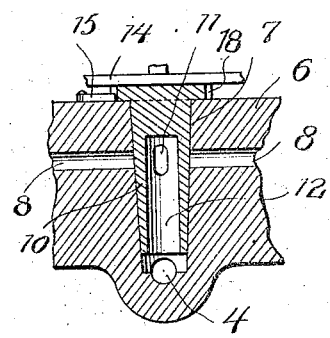

Referring to the drawings, forming a part of the specification, Figure 1 is a detail view, showing the application of the invention to an internal combustion engine used for driving an automobile. Fig. 2 is a sectional view. Fig. 3 is a top plan view. Fig. 4 is an enlarged section on the line 4—4 of Fig. 2. Fig. 5 is an enlarged plan view of the valve for directing the gas to the proper cylinder of the engine. Fig. 6 is a sectional view of the valve.

Corresponding and like parts are referred to in the following description, and indicated in all the views of the drawings, by the same reference characters.

The starting mechanism embodies a cylinder 1 in which is arranged to operate a piston $2^a$, the latter having connection with an operating device 3 which may be a foot lever or a hand operated lever. The size of the cylinder 1 and the stroke of the piston $2^a$ will vary and depend upon the nature of the engine for which the starting mechanism is devised. The cylinder 1 is closed at one end by means of a head 2 in which is formed an opening $3^a$ and a passage 4. The head 2 may be secured to the cylinder in any manner and as indicated the cylinder has an outer flange which is apertured to receive the bolts or machine screws employed for connecting the parts. One or more braces 5 may be interposed between the cylinder and the framework of the machine so as to strengthen the supporting means. The head 2 has an extension 6 in which is formed an opening 7 and a series of passages 8, the latter radiating from the opening 7 and adapted to be connected by pipes 9 with the several cylinders comprising the engine or motor provided for driving the automobile or other machinery to be operated. A plug valve 10 is mounted in the opening 7 and has an opening 11 to register with any one of the passages 8. The valve 10 has an axial opening 12 in register with the passage 4 and with which the opening 11 communicates. The outer end of the valve 10 is reduced, the reduced portion receiving a spur wheel 13, a plate 14, and a washer 16. The plate 14 is slipped upon the reduced end of the valve 10 and obtains a bearing against the shoulder formed at the base thereof, machine screws 17 passing through openings of the plate and connecting the latter to the extension 6, thereby retaining the valve 10 in place and admitting of adjustment of the valve to compensate for wear. The spur wheel 13 is secured to the reduced portion of the valve 10 to turn therewith and is retained in place by the washer 16. The outer end of the valve 10 is formed with a series of teeth 18 which are adapted to be engaged by means of a detent 15 so as to prevent backward rotation of the valve. A toothed bar 20 is connected with the rod of the piston $2^a$ by means of a spring 21 and is arranged to have its teeth 22 engage the spurs of the wheel 13 so as to turn the latter upon the forward or instroke of the piston 2ª when compressing the gaseous mixture in the cylinder 1. As the piston 2ª moves forward the valve 10 is rotated each time a tooth 22 engages a spur of the wheel 13, thereby causing the opening 11 of the valve 10 to successively register with the passages 8, thereby admitting a charge of gaseous mixture from the cylinder 1 into the cylinders of the engine. Upon the out or back stroke of the piston 2ª the teeth of the bar 20 ride upon the spurs of the wheel 13 without imparting any movement thereto, the spring 21 admitting of such action.

The generator is indicated at 23 and comprises a series of chambers 24 which are in communication with one another and with the cylinder 1. A carbureter 25 of any make, design or variety is employed in connection with the generator 23 for impregnating the air with the liquid fuel to produce the gaseous mixture which is drawn into the cylinder 1 and forced therefrom through the passage 4 and valve mechanism into the cylinders of the engine or motor. The generator 23 is more in the nature of a mixer and is supplied with sections of tubing 26 and 27 between which is located a tube 28 of absorbent material such as lamp wick, said parts serving to break up fluid particles so as to produce a homogeneous gaseous mixture which will ignite readily in the cylinder of the motor so as to start the same upon passage of the spark at the proper time. The generator or mixer 23 may be connected to the head 2 of the cylinder in any manner as by means of a right and left hand threaded coupling 28ª.

It will be understood from the foregoing, taken in connection with the accompanying drawings, that an automobile or engine of the internal combustion type may be readily started without requiring the operator to leave his seat in the machine or to turn a crank, thereby overcoming the objections incident to the use of a starting crank and free from the dangers resulting from back firing when starting a gasolene engine by means of the usual crank.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In starting mechanism for explosive engines embodying multiple cylinders, the combination of a cylinder, a piston arranged to operate in the cylinder for drawing in a gaseous mixture and expelling the same, and a valve mechanism having connection with the piston to be operated thereby and having connection with each of the cylinders of the engine for supplying the same with an initial charge to produce an explosion upon the passage of a spark.

2. In starting mechanism for explosive engines, the combination of a cylinder having an inlet and having a discharge opening in communication with each cylinder of the engine, a piston arranged to operate in the cylinder, a valve for controlling the discharge opening of the cylinder and the several passages leading to the engine cylinders, and operating means connecting said valve with the piston to admit of positively actuating said valve upon the forward stroke of the piston to expel the gaseous mixture from the cylinder.

3. In starting mechanism for explosive engines embodying multiple cylinders, the combination of a cylinder, a piston arranged to operate in the cylinder for drawing a gaseous mixture therein and expelling the same therefrom, a valve mechanism having communication with the said cylinder and with each of the cylinders of the engine and connected with the piston to be operated thereby, a carbureter, a mixer arranged between the carbureter and cylinder and comprising a series of chambers, and means arranged within said chambers for breaking up particles contained in the gaseous mixture to produce and insure a homogeneous easily ignitible mixture.

4. In engine starting mechanism, the combination of a cylinder, a piston arranged to operate therein, a rotatable valve for controlling the passages between the cylinder and the several cylinders of the engine or motor, a spur wheel having connection with said rotatable valve, and a toothed bar yieldably connected with the piston and adapted to ride upon the teeth of the spur wheel upon the back stroke of the piston and to engage with said spur wheel to operate the same upon the forward stroke of the piston to admit of the gaseous mixture passing to the cylinders of the engine in rotation.

In testimony whereof I affix my signature in presence of two witnesses.

ALONZO F. OLDS.

Witnesses:
  C. M. OLDS,
  FRANK KAUFMAN.

Copies of this patent may be obtained for five cents each, by addressing the "Commissioner of Patents, Washington, D. C."